No. 778,039. PATENTED DEC. 20, 1904.
G. K. DE W. HOLLAND.
HITCHING DEVICE.
APPLICATION FILED JULY 7, 1904.

NO MODEL.

Witnesses

Inventor
Geo. Kononaugh DeWitt Holland.

by H. B. Willson
Attorney

No. 778,039.

Patented December 20, 1904.

UNITED STATES PATENT OFFICE.

GEORGE K. DE W. HOLLAND, OF CLEBURNE, TEXAS.

HITCHING DEVICE.

SPECIFICATION forming part of Letters Patent No. 778,039, dated December 20, 1904.

Application filed July 7, 1904. Serial No. 215,657.

*To all whom it may concern:*

Be it known that I, GEORGE K. DE W. HOLLAND, a citizen of the United States, residing at Cleburne, in the county of Johnson and State of Texas, have invented certain new and useful Improvements in Hitching Devices; and I do declare the following to be a full, clear, and exact description of the invention, such as will enable others skilled in the art to which it appertains to make and use the same.

This invention relates to improvements in hitching devices.

The object of the invention is to provide a hitching device for horses and other animals whereby should said animals suddenly move their heads when the hitching strap or chain is taut the mouth of said animal will not be injured by the sudden jerk and a yielding of the said hitching strap or chain will be given.

A further object is to provide a device of this character which will permit the animal tied by the same to move around the hitching-post without liability of winding up the hitching-strap.

A still further object is to provide a hitching device of this character which will be simple in construction, durable, and well adapted for the purpose for which it is desired.

With these and other objects in view the invention consists of certain novel features of construction, combination, and arrangement of parts, as will be more fully described, and particularly pointed out in the appended claims.

Figure 1:
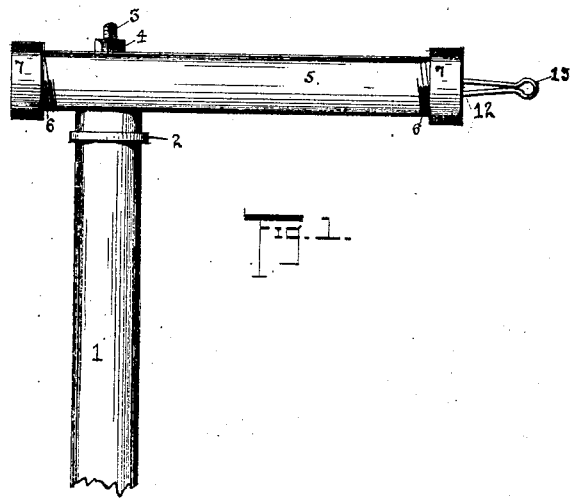
Figure 2:
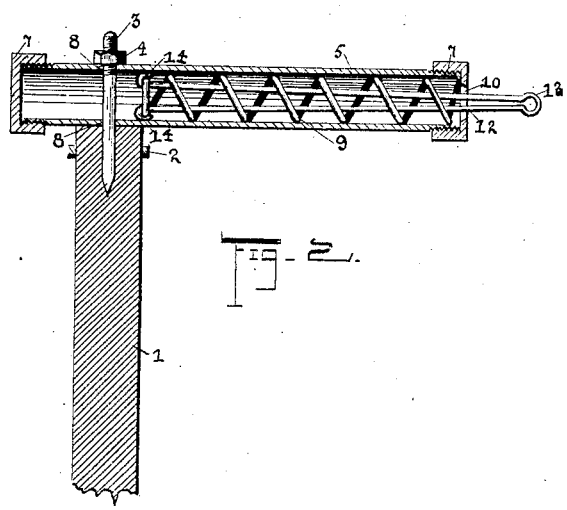

In the accompanying drawings, Figure 1 is a side elevation of a hitching post or device constructed in accordance with the invention. Fig. 2 is a longitudinal vertical sectional view of the same.

Referring more particularly to the drawings, 1 denotes a hitching-post, which may be of any suitable size and of any desired height, and said post may be constructed of wood or other suitable material and is provided near its upper end with a band or ferrule 2. On the upper end of the post 1 is driven or otherwise secured an upwardly-projecting bolt or bar 3, which is threaded on its upper end to receive a nut 4.

On the upper end of the post 1 is adapted to be supported a horizontally-disposed tube or pipe 5, the ends of which are exteriorly threaded, as at 6, to receive caps 7. Near one end of the pipe is formed two apertures 8, which are formed at diametrically opposite points in said pipe and through which is adapted to project the bolt 3, whereby said tube is pivotally supported on said post and is held against upward movement on said post by the nut 4.

Within the tube or pipe 5 is arranged a coiled spring 9, one end of which is adapted to bear against the inner side of the cap 7 on the end of the tube farthest from its connection with the post. In said cap is formed a centrally-disposed opening 10. Arranged within the tube or pipe 5 and passing through the spring 9 is a spring-steel rod 12, which is bent upon itself, and on the double end of the same is formed a ring 13, which is adapted to project through the opening 10 in said cap 7. The opposite or inner ends of the said rod 12 are bent outwardly to form hooks 14, which are adapted to engage the inner ends of the coil-spring 9.

When in use, the hitching strap or chain from the head-stall or bridle of the horse or other animal to be tied is connected to the ring 13 of the rod 12, so that when said animal moves his head said rod 12 will be drawn out through the opening 10 in the cap 7 against the tension of the spring 9, thereby affording a yielding connection for said hitching-strap, which will prevent sudden jerk or yank which would be otherwise given to said strap upon the sudden movement of the animal's head. As soon as the pull upon the strap is relieved the spring 9 will again retract the rod 12 into the tube 5.

By the use of a hitching device constructed as herein shown and described an animal may be tied with a comparatively short hitching-strap and the unnecessary slack of the same will be taken up, so that it will be impossible for the animal to get its legs over or tangled with said hitching-strap, thereby avoiding accident or injury to the animal.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a hitching device, the combination with a post having an upwardly-projecting threaded rod or bolt, a horizontally-disposed tube or pipe pivotally mounted near one end on said rod or bolt, and means arranged within said tube whereby a hitching strap or chain may be yieldingly connected thereto, substantially as described.

2. In a hitching device, the combination with a post having an upwardly-projecting threaded rod or bolt, a tube or pipe pivotally connected to the same to turn in a horizontal plane, means whereby said pipe is held on said rod or bolt, an apertured cap arranged on the outer end of said tube, a coiled spring arranged within the latter, and means connected with said spring whereby a hitching chain or strap may be yieldingly connected to said pivoted tube, substantially as described.

3. In a hitching device, the combination with a post having an upwardly-projecting threaded rod or bolt, a tube or pipe pivotally connected to the same to turn in a horizontal plane, means whereby said pipe is held on said rod or bolt, an apertured cap arranged on the outer end of said tube, a coiled spring arranged within the latter, a spring-metal rod doubled upon itself the doubled end of the same forming a hitching eye or loop and adapted to project through the aperture in said cap, hooks formed on the inner end of said rod to engage the inner end of said spring, thereby affording a yielding connection for the end of a hitching strap or chain, substantially as described.

4. In a hitching device, the combination with a post, of a horizontally-disposed tubular member pivotally connected to the post, and means in said tubular member whereby a hitching strap or chain may be yieldingly connected thereto, substantially as described.

In testimony whereof I have hereunto set my hand in presence of two subscribing witnesses.

GEORGE K. DE W. HOLLAND.

Witnesses:
B. S. MILNER,
JOHN W. ALLIN.